United States Patent
Russo et al.

(10) Patent No.: US 12,168,418 B2
(45) Date of Patent: Dec. 17, 2024

(54) DEVICE, SYSTEM, AND METHOD FOR AN ELECTRONIC RESPONSE TO A POTENTIAL CARJACKING

(71) Applicant: MOTOROLA SOLUTIONS, INC., Chicago, IL (US)

(72) Inventors: Pietro Russo, Melrose, MA (US); Barbara R. Doutre, Plantation, FL (US); Lin Lin, Inverness, IL (US); Daniel R. Bestor, Schaumburg, IL (US); Fanlan Jing, Hoffman Estates, IL (US); Rupa S. Vasara, Naperville, IL (US); John K. Klingert, Warren, NJ (US); Caroline J. Watson, Huntley, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 210 days.

(21) Appl. No.: 18/090,906

(22) Filed: Dec. 29, 2022

(65) Prior Publication Data
US 2024/0217479 A1 Jul. 4, 2024

(51) Int. Cl.
*B60R 25/102* (2013.01)
*B60R 25/10* (2013.01)
(Continued)

(52) U.S. Cl.
CPC ........ *B60R 25/102* (2013.01); *B60R 25/1001* (2013.01); *B60R 25/1012* (2013.01);
(Continued)

(58) Field of Classification Search
CPC .............. B60R 25/102; B60R 25/1001; B60R 25/1012; B60R 25/305; B60R 25/31; B60R 25/33; B60R 2025/1016
See application file for complete search history.

(56) References Cited

U.S. PATENT DOCUMENTS

| | | | |
|---|---|---|---|
| 6,211,818 B1 * | 4/2001 | Zach, Sr. .............. | B60R 25/102 342/357.31 |
| 6,717,508 B2 * | 4/2004 | Sashida ................... | B60R 25/04 340/426.3 |

(Continued)

FOREIGN PATENT DOCUMENTS

WO 2022094624 A1 5/2022

*Primary Examiner* — Nay Tun
(74) *Attorney, Agent, or Firm* — PERRY + CURRIER, INC.

(57) ABSTRACT

A device, system, and method for an electronic response to a potential carjacking is provided. A device receives: a location and vehicle ignition status of a vehicle; and sensor data generated by one or more sensors that are onboard the vehicle, the sensor data different from the location and the vehicle ignition status. The device determines whether the location of the vehicle is associated with a carjacking type of location, and whether a combination of the vehicle ignition status and the sensor data meet a carjacking threshold condition. When both the location of the vehicle is associated with the carjacking type of location and the carjacking threshold condition is met, the device: outputs an alert at the vehicle indicative of, or associated with, the potential carjacking; and/or causes, a notification to be transmitted to a communication device associated with a public safety agency or a monitoring service.

20 Claims, 5 Drawing Sheets

(51) Int. Cl.
*B60R 25/30* (2013.01)
*B60R 25/31* (2013.01)
*B60R 25/33* (2013.01)

(52) U.S. Cl.
CPC ............ *B60R 25/305* (2013.01); *B60R 25/31* (2013.01); *B60R 25/33* (2013.01); *B60R 2025/1016* (2013.01)

(56) References Cited

U.S. PATENT DOCUMENTS

| | | |
|---|---|---|
| 9,218,698 B2 | 12/2015 | Ricci |
| 9,747,795 B1 | 8/2017 | Espinosa |
| 10,202,103 B2 | 2/2019 | Munafo et al. |
| 10,421,437 B1 | 9/2019 | Koskan |
| 10,534,819 B2 | 1/2020 | Ricci |
| 11,016,190 B2 | 3/2021 | Koskan |
| 11,433,855 B2 | 9/2022 | Bielby et al. |
| 2003/0055557 A1* | 3/2003 | Dutta ..................... G01C 21/26 701/532 |
| 2003/0169161 A1* | 9/2003 | Brown .................. B60R 25/102 340/426.11 |
| 2016/0082925 A1* | 3/2016 | Arocha ................... B60R 25/34 340/426.24 |
| 2017/0147887 A1* | 5/2017 | Be .......................... G06V 20/56 |
| 2017/0232895 A1 | 8/2017 | Sines et al. |
| 2018/0253813 A1 | 9/2018 | Kaguma et al. |

\* cited by examiner

DEVICE, SYSTEM, AND METHOD FOR AN ELECTRONIC RESPONSE TO A POTENTIAL CARJACKING

BACKGROUND OF THE INVENTION

Carjacking has become a major problem in cities. Furthermore, statistics show that a carjacking generally needs to be responded to quickly or the carjacking may go unsolved. Increasingly, closed circuit cameras have been deployed in jurisdictions that may be used to detect crimes such as carjackings, but such detection may be slow and/or may not result in a fast response to a carjacking.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
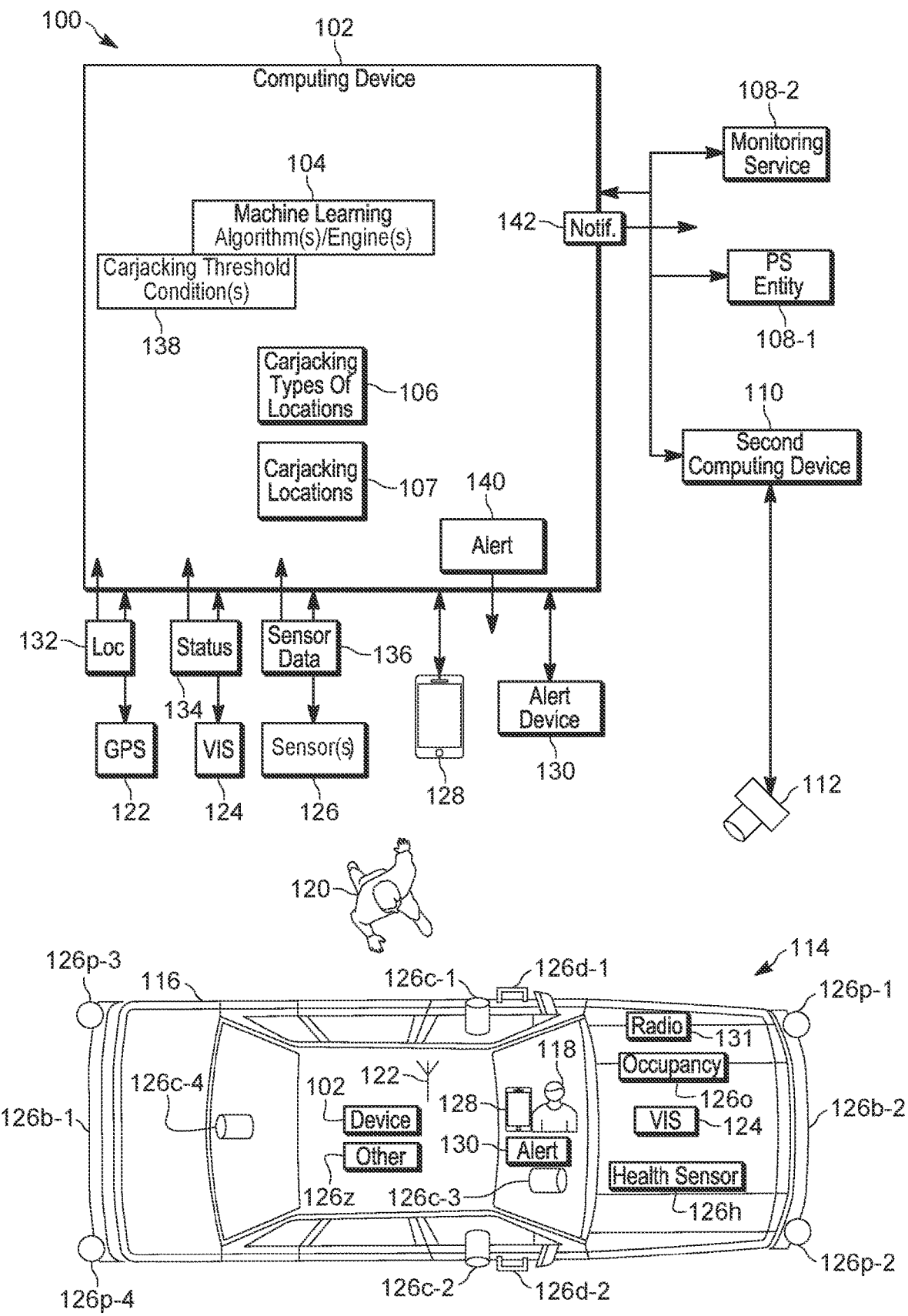
FIG. 1 is a system for an electronic response to a potential carjacking, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Carjacking has become a major problem in cities. Furthermore, statistics show that a carjacking generally needs to be responded to quickly or the carjacking may go unsolved. Increasingly, closed circuit cameras have been deployed in jurisdictions that may be used to detect crimes such as carjackings, but such detection may be slow, in accurate, and/or may not result in a fast response to a carjacking. While some vehicles are now equipped with radios to contact a monitoring service in the event of problems at the vehicle, such monitoring services still rely on a driver of the vehicle to contact them in the event of crimes, for example.

Thus, there exists a need for an improved technical method, device, and system for an electronic response to a potential carjacking.

Hence, provided herein is a device, system, and method for an electronic response to a potential carjacking. For example, a computing device is provided that is in communication with sensors at a vehicle, which may include, but are not limited to, one or more cameras (e.g., dashcams), door handle sensors, front and/or rear bumper impact sensors, a driver occupancy sensor, a driver vital signs sensor, perimeter sensors, and the like. The computing device is in further communication with a vehicle ignition status sensor at the vehicle, and the like, and a location determining device, such as a Global Positioning System (GPS) device, and the like, at the vehicle. The computing device may comprise a computing device of the vehicle, and/or the computing device may comprise a communication device, such as a cell phone, and the like, located inside the vehicle, and/or the computing device may comprise a dongle plugged into an on-board diagnostics (OBD) port of the vehicle (e.g., such as an OBD-II port), and/or the computing device may comprise one or more cloud computing devices in wireless communication with the sensors at the vehicle.

Regardless of a configuration and/or location of the computing device, the computing device may receive and/or determine a location of the vehicle (e.g., from the GPS device), a vehicle ignition status of the vehicle (e.g., from a vehicle ignition status sensor) and vehicular sensor data generated by one or more sensors that are onboard the vehicle, the vehicular sensor data different from the location and the vehicle ignition status.

The computing device may be generally configured to determine whether the location of the vehicle is associated with a carjacking type of location. Alternatively, and/or in addition, the computing device is generally configured to determine whether the location of the vehicle is associated with a carjacking location.

Furthermore, the computing device is generally configured to determine whether a combination of the vehicle ignition status and the vehicular sensor data meet a carjacking threshold condition, which may also be dependent on the location.

For example, a carjacking type of location may comprise a type of location that is generally high in carjackings, for example as indicated by carjacking statistics, and the like. For example, a carjacking type of location may comprise any location where vehicles stop or slow down, while the vehicle ignition status remains active and/or on, and/or while the vehicle ignition status is in an on-state, including, but not limited to, stop lights, intersections, vehicular right of ways, garages, parking lots, drive-through automated teller machines (ATMs), valet stations, and the like.

In contrast, a carjacking location may comprise a specific location (e.g., indicated by GPS coordinates, and the like), which is statistically high in carjackings.

Furthermore, a carjacking threshold condition may depend on a location, at which the vehicle is located. For example, when the one or more sensors comprise one or more cameras onboard the vehicle, and when the vehicle is at an intersection, the carjacking threshold condition may comprise: the vehicle ignition status being in an on-state: and image data from one or more cameras onboard the vehicle indicating a person approaching a driver side door of the vehicle. However, when the vehicle is at a valet station intersection, the carjacking threshold condition may comprise: the vehicle ignition status being in an on-state: and image data from one or more cameras onboard the vehicle indicating a person approaching a driver side door of the vehicle, the person wearing street clothes and not a valet uniform and/or name tag, and the like.

Hence, it is understood that, in some examples, the computing device may include a video analytics module, which may be provided in the form of one or more machine learning algorithms and/or engines, which may analyze images from on board cameras and, together with the vehicle ignition status, determine whether a carjacking threshold condition is met.

However, other types of sensor data (e.g., in addition to, and/or alternative to) image data may be used to determine whether a carjacking threshold condition is met.

For example, carjackings may occur when a vehicle is stopped at an intersection, the vehicle ignition status is in an on-state, and at least an exterior driver door handle sensor senses external driver door handle sensor data indicating a driver door being opened. Hence, a carjacking threshold condition may be met when the vehicle ignition status is in an on-state, and the exterior driver door handle sensor data indicates a driver door being opened. However, when the vehicle is at a valet station, a carjacking threshold condition may be met when the vehicle ignition status is in an on-state, the exterior driver door handle sensor data indicates a driver door being opened, image data from one or more cameras onboard the vehicle indicates a person approaching a driver side door of the vehicle, the person wearing street clothes and not a valet uniform and/or name tag, and the like.

Such carjacking conditions may further include, but are not limited to image data from one or more cameras onboard the vehicle indicates a person approaching a driver side door of the vehicle, the person wearing street clothes and not a police officer uniform and/or badge, and the like.

Other carjacking threshold conditions will be described herein.

The computing device is further configured to, when both a location of a vehicle is associated with a carjacking type of location (and/or a carjacking location) and a carjacking threshold condition is met, one or more of: output an alert at the vehicle indicative of, or associated with, the potential carjacking: and cause a in notification to be transmitted to a communication device associated with a public safety agency or a monitoring service, the notification indicative of the potential carjacking. In some examples the computing device may transmit the notification while in other examples, the computing device may control another device to transmit the notification.

For example, an alert at the vehicle indicative of, or associated with, the potential carjacking may comprise a visual and/or audible alert at a dashboard display screen and/or speaker that alerts a driver to a potential carjacking, such as "Alert! Potential Carjacking. Person Is Approaching." However, such an alert may occur at a communication device, such as a cell phone, that is internal to the vehicle and in communication with the computing device. The alert may alternatively comprise a car alarm and/or the alert may comprise outputting an audible announcement at an internal or external speaker, that queries the driver as to their status, but without using the term "carjacking" such as "Please check the person approaching" and/or "Are you OK" and the like.

A notification indicative of the potential carjacking transmitted to a communication device associated with a public safety agency or a monitoring service may include a location of the vehicle, an identifier that a potential carjacking may be occurring, and the like. The public safety agency to which the notification may be transmitted may be a police entity, and the like, and/or the monitoring service to which the notification may be transmitted may be a vehicle monitoring service, which has an associated communication device and/or radio, and the like, installed in the vehicle to contact the driver of the vehicle.

The notification may hence cause police to be dispatched to the location of the vehicle and/or a police dispatch to access closed circuit cameras at the location of the vehicle to confirm whether a carjacking is occurring. Alternatively, and/or in addition, the notification may cause the monitoring service to contact the driver via the radio to confirm whether a carjacking is occurring, and/or the monitoring service may have access to one or more cameras at the vehicle, or another vehicle at the same location, to confirm whether a carjacking is occurring: the monitoring service, having confirmed that carjacking is occurring, may contact the police accordingly.

An aspect of the present specification provides a method for an electronic response to a potential carjacking, the method comprising: receiving, via a computing device, a location of a vehicle: receiving, via the computing device, a vehicle ignition status of the vehicle: receiving, via the computing device, vehicular sensor data generated by one or more sensors that are onboard the vehicle, the vehicular sensor data different from the location and the vehicle ignition status: determining, via the computing device, whether the location of the vehicle is associated with a carjacking type of location: determining, via the computing device, whether a combination of the vehicle ignition status and the vehicular sensor data meet a carjacking threshold condition: and when both the location of the vehicle is associated with the carjacking type of location and the carjacking threshold condition is met, one or more of: outputting an alert at the vehicle indicative of, or associated with, the potential carjacking: and causing a notification to be transmitted to a communication device associated with a public safety agency or a monitoring service, the notification indicative of the potential carjacking.

Another aspect of the present specification provides a device for an electronic response to a potential carjacking, the device comprising: a communication interface; and a controller, the controller configured to: receive a location of a vehicle: receive a vehicle ignition status of the vehicle: receive vehicular sensor data generated by one or more sensors that are onboard the vehicle, the vehicular sensor data different from the location and the vehicle ignition status: determine whether the location of the vehicle is associated with a carjacking type of location; determine whether a combination of the vehicle ignition status and the vehicular sensor data meet a carjacking threshold condition; and when both the location of the vehicle is associated with the carjacking type of location and the carjacking threshold condition is met, one or more of: output an alert at the vehicle indicative of, or associated with, the potential carjacking: and causing, via the communication interface, a notification to be transmitted to a communication device associated with a public safety agency or a monitoring service, the notification indicative of the potential carjacking.

Yet another aspect of the present specification provides a method for an electronic response to a potential carjacking, the method comprising: receiving, via a computing device, a location of a vehicle: receiving, via the computing device, a vehicle ignition status of the vehicle: receiving, via the computing device, vehicular sensor data generated by one or more sensors that are onboard the vehicle, the vehicular sensor data different from the location and the vehicle ignition status; determining, via the computing device, whether the location of the vehicle is associated with a carjacking location: determining, via the computing device, whether a combination of the vehicle ignition status and the vehicular sensor data meet a carjacking threshold condition: and when both the location of the vehicle is associated with the carjacking location and the carjacking threshold condition is met, one or more of: outputting an alert at the vehicle indicative of, or associated with, the potential carjacking: and causing a notification to be transmitted to a communication device associated with a public safety agency or a monitoring service, the notification indicative of the potential carjacking.

Yet another aspect of the present specification provides a device for an electronic response to a potential carjacking, the device comprising: a communication interface: and a controller, the controller configured to: receive a location of a vehicle; receive a vehicle ignition status of the vehicle: receive vehicular sensor data generated by one or more sensors that are onboard the vehicle, the vehicular sensor data different from the location and the vehicle ignition status: determine whether the location of the vehicle is associated with a carjacking location: determine whether a combination of the vehicle ignition status and the vehicular sensor data meet a carjacking threshold condition; and when both the location of the vehicle is associated with the carjacking location and the carjacking threshold condition is met, one or more of: output an alert at the vehicle indicative of, or associated with, the potential carjacking: and causing, via the communication interface, a notification to be transmitted to a communication device associated with a public safety agency or a monitoring service, the notification indicative of the potential carjacking.

Yet another aspect of the present specification provides a method for an electronic response to a potential carjacking, the method comprising: receiving, via a computing device, a location of a vehicle: receiving, via the computing device, a vehicle ignition status of the vehicle: receiving, via the computing device, vehicular sensor data generated by one or more sensors that are onboard the vehicle, the vehicular sensor data different from the location and the vehicle ignition status; determining, via the computing device, whether the location of the vehicle is associated with a carjacking type of location and/or a carjacking location; determining, via the computing device, whether a combination of the vehicle ignition status and the vehicular sensor data meet a carjacking threshold condition; and when both the location of the vehicle is associated with the carjacking type of location, and/or the carjacking location, and the carjacking threshold condition is met, one or more of: outputting an alert at the vehicle indicative of, or associated with, the potential carjacking: and causing a notification to be transmitted to a communication device associated with a public safety agency or a monitoring service, the notification indicative of the potential carjacking.

Yet another aspect of the present specification provides a device for an electronic response to a potential carjacking, the device comprising: a communication interface: and a controller, the controller configured to: receive a location of a vehicle; receive a vehicle ignition status of the vehicle: receive vehicular sensor data generated by one or more sensors that are onboard the vehicle, the vehicular sensor data different from the location and the vehicle ignition status: determine whether the location of the vehicle is associated with a carjacking type of location and/or a carjacking location: determine whether a combination of the vehicle ignition status and the vehicular sensor data meet a carjacking threshold condition: and when both the location of the vehicle is associated with the carjacking type of location, and/or the carjacking location, and the carjacking threshold condition is met, one or more of: output an alert at the vehicle indicative of, or associated with, the potential carjacking; and causing, via the communication interface, a notification to be transmitted to a communication device associated with a public safety agency or a monitoring service, the notification indicative of the potential carjacking.

Each of the above-mentioned aspects will be discussed in more detail below, starting with example system and device architectures of the system in which the embodiments may be practiced, followed by an illustration of processing blocks for achieving an improved technical method, device, and system for an electronic response to a potential carjacking.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via the cloud in any of a software as a service (Saas), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Herein, the term "engine", such as a machine learning engine, is understood to refer to hardware, and/or a combination of hardware and software (e.g., a combination of hardware and software includes software hosted at hardware, such as a software module that is stored at a processor-readable memory implemented or interpreted by a processor), or hardware and software hosted at hardware and/or implemented as a system-on-chip architecture and the like.

Further advantages and features consistent with this disclosure will be set forth in the following detailed description, with reference to the drawings.

Attention is directed to FIG. 1, which depicts an example system 100 for an electronic response to a potential carjacking. The various components of the system 100 are in communication via any suitable combination of wired and/or wireless communication links, and communication links between components of the system 100 are depicted in FIG. 1, and throughout the present specification, as double-ended arrows between respective components: the communication links may include any suitable combination of wireless and/or wired links and/or wireless and/or wired communication networks, and the like.

The system 100 comprises a computing device 102 that is interchangeably referred to hereafter as the device 102. As depicted, the device 102 further implements one or more machine learning algorithms 104, which, as depicted, may be implemented as one or more machine learning engines. For simplicity, the one or more machine learning algorithms 104 and/or one or more machine learning engines are interchangeably referred to hereafter as a machine learning algorithm 104.

As depicted, the device 102 further stores, and/or has access to, carjacking types 106 of locations that are associated with carjackings, and which may include, but is not limited to, a list and/or a database, and the like, of specific location types that are statistically high in carjackings which may include, but is not limited to, stop lights, intersections, vehicular right of ways, garages, parking lots, drive-through automated teller machines (ATMs), valet stations, and the like. Hence, the carjacking types 106 of locations may comprise general indications of types of locations where carjackings may occur, and the like, which may be used to identify such locations on a map, and the like, which may be provided as a component of the carjacking types 106 of locations. For example, a carjacking type 106 of location may comprise "Garages", and a map, and the like (e.g., such as a maps and/or database of garage locations) may be used to determine whether a given location, such as a location of a vehicle, comprises a garage.

As depicted, the device 102 further stores, and/or has access to, carjacking locations 107 which may be provided in the form of a database and/or map, and which more specifically (e.g., as compared to the carjacking types 106 of locations) comprise given locations (e.g., such as specific intersections, specific parking lots, and the like), for example a determined from crime statistics, and/or that have a high risk of carjackings (e.g., locations that have a carjacking rate above a given threshold carjacking rate such as 1 per week, 2 per week, amongst other possibilities). Such carjacking locations 107 may be provided in a form of one or more of electronically stored GPS coordinates, unique beacons from known beacon locations, and/or image matching locations (e.g., stored images or machine learning models (e.g., neural network layers) that match visual locations such as between dashed lines in the middle of the road).

The carjacking types 106 of locations and/or the carjacking locations 107 may represent, but are not limited to, stop lights, intersections, vehicular rights of way, garages, parking lots (e.g., parking lots for mass transit, shopping malls, grocery stores, amongst other possibilities), self-serve gas stations, car washes, automated teller machines (ATMs) (e.g., drive-through automated teller machines), residential driveways, and streets. More generally, a carjacking type 106 of locations/or the carjacking locations 107 may respectively comprise any suitable general and/or specific location where vehicles stop or slow down, while the vehicle ignition status is in an on-state, and/or where people get into and out of cars. However, as such types of locations may be at most city streets, the carjacking locations 107 may more specifically indicate given locations where carjackings are statistically high and/or are above a given carjacking rate.

The carjacking types 106 of locations and/or the carjacking locations 107 may be maintained by monitoring service (described below) and/or updated periodically during maintenance of the vehicle 116 (e.g., via electronic updates available from a manufacturer of the vehicle 116, and the like), and/or on a subscription basis.

As depicted, the device 102 is configured to communicate with one or more communication devices 108-1, 108-2. The communication devices 108-1, 108-2 are interchangeably referred to hereafter, collectively, as the communication devices 108 and, generically, as a communication device 108. This convention will be used elsewhere in the present specification.

As depicted, the communication device 108-1 is associated with, and/or operated by, a public-safety (PS) entity, such as a police department, and/or a public-safety answering point (PSAP) and/or a public-safety dispatch, and the like.

As depicted, the communication device 108-2 is associated with, and/or operated by, a monitoring service, such as a vehicle monitoring service, which has associated radios, and the like, installed in vehicles to contact drivers of vehicles (and/or so that drivers of vehicles may contact the vehicle monitoring service) in the event of an emergency, and the like. Such vehicle monitoring services may offer road-side assistance services, and the like.

While only two communication devices 108 are depicted, the system 100 may comprise any suitable number of communication devices 108 including as few as one communication device 108 (e.g., associated with a police entity or a monitoring service), or more than two communication devices 108 (e.g., respective associated different police entities and/or different monitoring services).

As depicted, the device 102 is optionally configured to communicate with a second computing device 110 in communication with camera 112 located, for example, at a location 114 of a vehicle 116. The camera 112 may comprise a closed circuit camera monitored by a PSAP and/or a police department, and the like, such as the entity associated with the communication device 108-1, and/or the camera 112 may be located in another vehicle (not depicted) monitored by the monitoring service associated with the communication device 108-2. As such, as depicted, the second computing device 110 may be in communication with one or more of the communication devices 108: alternatively, the second computing device 110 may be combined with one or more of the communication devices 108. Furthermore, as depicted, the communication devices 108 may be in communication with each other.

While the vehicle 116 is depicted as a sedan, the vehicle 116 may be any suitable type of vehicle that may be carjacked, including, but not limited to any suitable type of consumer vehicle and/or commercial vehicle (e.g., a sports utility vehicle, a van, a pickup truck, a semi-trailer, a delivery truck, etc.). However, in other examples, the vehicle 116 may comprise a public-safety vehicle such as a police car, and the like.

As depicted, the vehicle 116 is understood to be located at the location 114, which may be any suitable location where the vehicle 116 may be stopped and/or slowing down and/or speeding up, for example as operated by a driver 118. Such a location 114 may associated with a carjacking type 106 of location and/or a carjacking location 107.

For example, as depicted, a person 120 is approaching a driver side door of the vehicle 116 who may, or may not, be a carjacker. For example, rather than a carjacker, the person 120 may be a public-safety officer, such as a police officer, or the person 120 may be a valet, and the like.

As depicted, the vehicle 116 comprises a location determining device 122, and the like, a vehicle ignition sensor (VIS) 124, and the like and a plurality of sensors 126, which may, in combination with location and VIS sensor status (described in more detail below with respect to a vehicle ignition status 134), be used to detect a potential carjacking, as described herein.

The location determining device 122 may comprise a GPS device, and the like, configured to determine location data indicating the location 114 of the vehicle 116. However, alternatively, and/or in addition, location determining device 122 may comprise a location cellular tower triangulation device (e.g., which determines location data based on communicating with three (or more) cellular towers to determine a triangulated location), a fixed beacon locationing device (e.g., which communicates with beacon devices that broadcast a location thereof in a "beacon": in these examples, a location broadcast by a beacon device nearest to the vehicle 116 (as determined by relative signal strengths of locations broadcast by a plurality of beacon devices) may comprise the location data), and the like.

The VIS 124 may comprise any suitable device and/or sensor configured to determine a vehicle ignition status of the vehicle 116, which may include, but is not limited to the vehicle ignition status being in an on-state (e.g., an engine of the vehicle 116, whether gasoline, diesel, electric and/or hybrid is on and/or in a state ready to propel the vehicle 116) or an off-state (e.g., the engine of the vehicle is off and/or not in a state ready to propel the vehicle 116).

The sensors 126 include but are not limited to:

One or more bumper impact sensors 126b-1, 126b-2 (e.g., bumper impact sensors 126b and/or a bumper impact sensor 126b) including, but not limited to, a rear bumper impact sensor 126b-1 and a front bumper impact sensor 126b-2, and the like. The bumper impact sensors 126b are generally configured to acquire impact sensor data, indicating whether the vehicle 114 has been bumped, for example by another vehicle, from the rear and/or the front, and/or the bumper impact sensors 126b may ascertain a magnitude of the bump.

One or more cameras 126c-1, 126c-2, 126c-3, 126c-4 (e.g., cameras 126c and/or a camera 126c) that may include, but are not limited to, sideview cameras (e.g., the cameras 126c-1, 126c-2), dashboard cameras (e.g., the camera 126c-3, which may comprise a front dashcam), rearview cameras (e.g., the camera 126c-4, which may comprise a rear dashcam), and the like. The cameras 126c are generally configured to acquire image data, including, but not limited to video data, around the exterior of the vehicle 116. However, one or more cameras 126c may be located at the interior of the vehicle 116, and image data from such interior cameras 126c may be used to determine a condition of the driver 118, such as whether the driver 118 is slumped over a steering wheel of the vehicle 116, and the like.

One or more door handle sensors 126d-1, 126d-2 (e.g., door handle sensors 126d and/or a door handle sensor 126d) including, but not limited to an exterior driver door handle sensor 126d-1, an exterior passenger door handle sensor 126d-2, and the like. The door handle sensors 126d are generally configured to acquire door handle sensor data, indicating whether a respective door of the vehicle 116 is being opened and/or whether a respective door handle of a door of the vehicle 116 is being actuated.

A health sensor 126h generally configured to acquire driver health status data, indicating for example, a heart rate of the driver 118, blood pressure of the driver 118, and/or any other suitable health status. Note that while the health sensor 126h is depicted as being a component of the vehicle 116, the health sensor 126h may comprise a health sensor worn by the driver 118.

An occupancy sensor 126o generally configured to acquire driver occupancy status data, indicating whether the driver 118 is present in the vehicle 116. While not depicted, the vehicle 116 may, additionally or alternatively, comprise a passenger occupancy sensor. An occupancy sensor 126o may be incorporated into a seat of the vehicle 116 (e.g. a driver's seat and/or a passenger seat), and detect occupancy based on a detected weight of a driver and/or passenger and/or detected pressure applied by a driver and/or passenger sitting in a seat of the vehicle 116. Alternatively, or in addition, an occupancy sensor 126o may comprise a motion sensor and/or an object sensor configured to detect occupancy of a driver and/or a passenger in a driver's seat and/or a passenger seat of the vehicle 116.

One or more perimeter sensors 126p-1, 126p-2, 126p-3, 126p-4 (e.g., perimeter sensors 126p and/or a perimeter sensor 126p) including, but not limited to front driver and passenger side perimeter sensors 126p-1, 126p-2, and rear driver and passenger side perimeter sensors 126p-3, 126p-4, and the like. The perimeter sensors 126p are generally configured to acquire perimeter data, indicating whether an object, such as the person 120, is within a given perimeter and/or given distance from the vehicle 116. A perimeter sensor 126p may rely on one or more of radar, light, infrared light, and/or any other suitable technology to detect whether an object, such as the person 120, is within a given perimeter and/or given distance from the vehicle 116. Furthermore, a perimeter sensor 126p may comprise a motion detector, a laser-based sensor, a radar-based sensor, an infrared-based sensor, and the like, configured to detect whether an object, such as the person 120, is within a given perimeter and/or given distance from the vehicle 116.

One or more other sensor 126z, such as one or more one or more of an environmental condition sensor and a vehicular condition sensor. Such an environment condition sensor may sense an environment around the vehicle 116, such as when it is raining, a temperature, and the like. A vehicular condition sensor, and the like, may sense a condition of the vehicle 116, such as when the vehicle 116 has been damaged, and the like. For example, condition data from such an environmental condition sensor and/or vehicular condition sensor, in combination with other sensor data 126, such as image data from the one or more cameras 126c, may indicate that the driver 118 needs help and/or does not need help in overcoming one or more of environmental conditions and vehicular conditions, as described in more detail below.

While certain types of sensors 126 are depicted in specific locations at the vehicle 116, it is understood that the vehicle 116 may comprise any suitable number of any suitable type of sensors 126, in any suitable locations.

As depicted, the driver 118 is further carrying, and/or has placed in the vehicle 116, a communication device 128, such as a cell phone, and the like.

Furthermore, as depicted, the vehicle 116 may comprise an alert device 130, including, but not limited to, any suitable combination of a display screen, a speaker, a heads-up display, and the like. In some examples, the alert device 130 may comprise a component of a dashboard of the vehicle 116 and/or the alert device 130 may comprise a car alarm device. However, alternatively, and/or in addition, the alert device 130 may be a component of the communication device 128.

As depicted, the vehicle 116 may comprise a radio 131, which may be used to communicate with the communication devices 108 and/or the second computing device 110.

While details of the computing device 102 are depicted in an upper portion of FIG. 1 as separate from the vehicle 116, the computing device 102 may be component of the vehicle 116 (e.g., as also depicted in FIG. 1), however the computing device 102 may alternatively comprise the communication device 128 (or vice versa), and/or the computing device 102 may alternatively comprise a dongle, and the like, plugged into an ODB-II port, and the like, of the vehicle 116. Alternatively, the computing device 102 may comprise one or more cloud computing devices and/or servers in communication with components of the vehicle 116 via the radio 131, and the like.

However, the various components of the system 100 may be combined in any suitable manner. For example the radio 131 may be a component of the device 102 when the device 102 is located at the vehicle 116, and/or the radio 131 may be a component of the communication device 128. Similarly, the alert device 130 and/or the health sensor 126h may be a component of the communication device 128.

Furthermore, one or more of the sensors 126 may be incorporated into the communication device 128, such as a camera 126c, and the like.

Furthermore, depending on locations of the sensors 126 and/or a location of the device 102, the sensors 126 may be in wired or wireless communication with the device 102 (or a combination thereof).

Regardless, as shown in the upper portion of FIG. 1, the device 102 is generally in communication with the location determining device 122 (also labelled as a "GPS"), the VIS 124, the sensors 126, the communication device 128 and the alert device 130.

The device 102 is generally configured to receive a location data 132 (e.g., GPS data from the location determining device 122) indicating the location 114 of the vehicle 116, a vehicle ignition status 134 of the vehicle 116 (e.g., from the VIS 124) and vehicular sensor data 136 (e.g., generated by the one or more sensors 126 that are onboard the vehicle 116). The vehicle ignition status 134 may be provided in a form of binary and/or Boolean data: for example, the vehicle ignition status 134 may comprise "1" or "0", with "1" indicating that an engine of the vehicle 116, is on and/or in an on-state and/or in a state ready to propel the vehicle 116, and "0" indicating that an engine of the vehicle 116, is off and/or in an off-state and/or not in a state ready to propel the vehicle 116. Alternatively, and/or in addition, the vehicle ignition status 134 may be provided in a form indicative of a transmission status of the vehicle 116, such as "Drive" and/or "Park" indicating that an engine of the vehicle 116, is on and/or in an on-state and/or in a state ready to propel the vehicle 116, and a "Null" value, and the like, indicating that an engine of the vehicle 116, is off and/or in an off-state and/or not in a state ready to propel the vehicle 116, amongst other possibilities.

The device 102 is generally configured to determine whether the location 114 of the vehicle 116 is associated with a carjacking type 106 of location. For example, the location 114 of the vehicle 116 may be received in the location data 132 and compared to a map, and the like, to determine a type of the location 114 (e.g., such as a garage or a parking lot) which is compared to the carjacking types 106 of locations to determine whether the location 114 is carjacking type of location.

Alternatively, and/or in addition, the device 102 may be configured to determine whether the location 114 is a carjacking location 107. For example, the location 114 of the vehicle 116 may be received in the location data 132 and compared to a map and/or a database, and the like, indicating specific carjacking locations 107, and the like, to determine whether the location 114 is carjacking location.

The device 102 is further generally configured to determine whether a combination of the vehicle ignition status 134 and the vehicular sensor data 136 meet a carjacking threshold condition 138, which, for example, may be implemented at the machine learning algorithm 104. For example, when the machine learning algorithm 104 comprises a neural network, the carjacking threshold condition 138 may be implemented as one or more neural network layers.

However, alternatively, and/or in addition, whether the carjacking threshold condition 138 is met may be determined via one or more numerical algorithms.

Different carjacking threshold conditions 138 will be described in more detail below, however generally, when both the location 114 of the vehicle is associated with a carjacking type 106 of location, and/or a carjacking location 107, and the carjacking threshold condition 138 is met, a potential carjacking may be occurring. Put another way, when both the location 114 of the vehicle is associated with a carjacking type 106 of location (and/or a carjacking location 107) and the carjacking threshold condition 138 is met, the person 120 may be potentially carjacking the vehicle 116.

Hence, when both the location 114 of the vehicle is associated with a carjacking type 106 of location (and/or a carjacking location 107) and the carjacking threshold condition 138 is met, the device may one or more of: output an alert 140 at the vehicle 116 (e.g., at the alert device 130 and/or the communication device 128) indicative of, or associated with, the potential carjacking: and cause a notification 142 to be transmitted to a communication device 108 associated with a public safety agency or a monitoring service, the notification 142 indicative of the potential carjacking. As the alert 140 and the notification 142 depicted in FIG. 1, it assumed that both the location 114 of the vehicle is associated with a carjacking type 106 of location (and/or a carjacking location 107) and the carjacking threshold condition 138 is met.

The alert 140 may generally alert the driver 118 to the potential carjacking so that the driver 118 may lock the doors of the vehicle 116 and/or drive away and/or take another action to prevent the carjacking.

The notification 142 may notify the public safety agency or the monitoring service of the potential carjacking to cause the public safety agency or the monitoring service to implement a public-safety type action to prevent the carjacking and/or intervene in the carjacking and/or communicate with the second computing device 110 to control the camera 112 to acquire images and/or video of the carjacking, and the like. Furthermore, the notification 142 may be transmitted by the computing device 102e (e.g., as depicted), and/or the computing device 102 may cause (e.g., control) another device, such as the radio 131 (e.g., when the computing device 102 and the radio 131 are separate) to transmit the notification 142.

Figure 2:
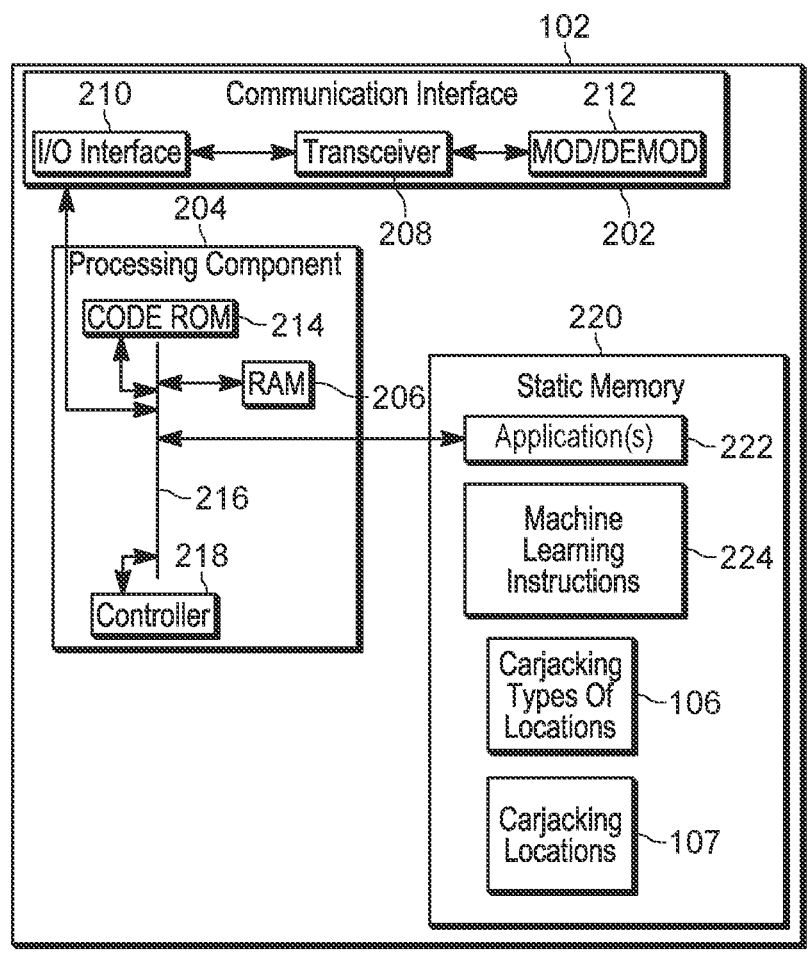
FIG. 2 is a device diagram showing a device structure of a communication device for an electronic response to a potential carjacking, in accordance with some examples.

Attention is next directed to FIG. 2, which depicts a schematic block diagram of an example of the device 102. While the device 102 is depicted in FIG. 2 as a single component, functionality of the device 102 may be distributed among a plurality of components, such as at the vehicle 116, the communication device 128, a plurality of servers and/or cloud computing devices and the like.

As depicted, the device 102 comprises: a communication interface 202, a processing component 204, a Random-Access Memory (RAM) 206, one or more wireless transceivers 208, one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. The controller 218 is understood to be communicatively connected to other components of the device 102 via the common data and address bus 216. Hereafter, the at least one application 222 will be interchangeably referred to as the application 222. Furthermore, as depicted, the memory 220 stores the carjacking types 106 of locations and the carjacking locations 107.

Furthermore, while the memories 206, 214 are depicted as having a particular structure and/or configuration, (e.g., separate RAM 206 and ROM 214), memory of the device 102 may have any suitable structure and/or configuration.

While not depicted, the device 102 may include one or more of an input device and/or a display screen, which, when present, may be communicatively coupled to the controller 218.

As shown in FIG. 2, the device 102 includes the communication interface 202 communicatively coupled to the common data and address bus 216 of the processing component 204.

The processing component 204 may include the code Read Only Memory (ROM) 214 coupled to the common data and address bus 216 for storing data for initializing system components. The processing component 204 may further include the controller 218 coupled, by the common data and address bus 216, to the Random-Access Memory 206 and the static memory 220.

When the device 102 is located at the vehicle 116, the radio 131 may comprise the communication interface 202.

The communication interface 202 may include one or more wired and/or wireless input/output (I/O) interfaces 210 that are configurable to communicate with other components of the system 100. For example, the communication interface 202 may include one or more wired and/or wireless transceivers 208 for communicating with other suitable components of the system 100.

Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP ($3^{rd}$ Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

However, it is understood that transceivers 208 of certain types, such as DMR transceiver, P25 transceiver, a TETRA transceiver, may be specifically used by public-service entities, and hence such transceivers 208 may not be present unless the vehicle 116 comprises a public-services vehicle such as a police car, and the like. In examples where the vehicle 116 comprises a consumer and/or a commercial vehicle, such transceivers 208 may be absent.

When the device 102 comprises a cloud computing device and/or a server, and the like, the communication interface 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network.

The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the device 102 is not a generic controller and/or a generic device, but a device specifically configured to implement functionality for an electronic response to a potential carjacking. For example, in some examples, the device 102 and/or the controller 218 specifically comprises a computer executable engine configured to implement functionality for an electronic response to a potential carjacking.

The static memory 220 comprises a non-transitory machine readable medium that stores machine readable instructions to implement one or more programs or applications. Example machine readable media include a non-volatile storage component (e.g., Erasable Electronic Programmable Read Only Memory ("EEPROM"), Flash Memory) and/or a volatile storage component (e.g., random-access memory ("RAM")). In the example of FIG. 2, programming instructions (e.g., machine readable instructions) that implement the functionality of the device 102 as described herein are maintained, persistently, at the memory 220 and used by the controller 218, which makes appropriate utilization of volatile storage during the execution of such programming instructions.

As depicted, the memory 220 further stores one or more sets of machine learning algorithm (and/or engine) instructions 224 that, when executed by the controller 218, enables the controller 218 to implement the machine learning algorithm (and/or engines) 104.

Figure 3:
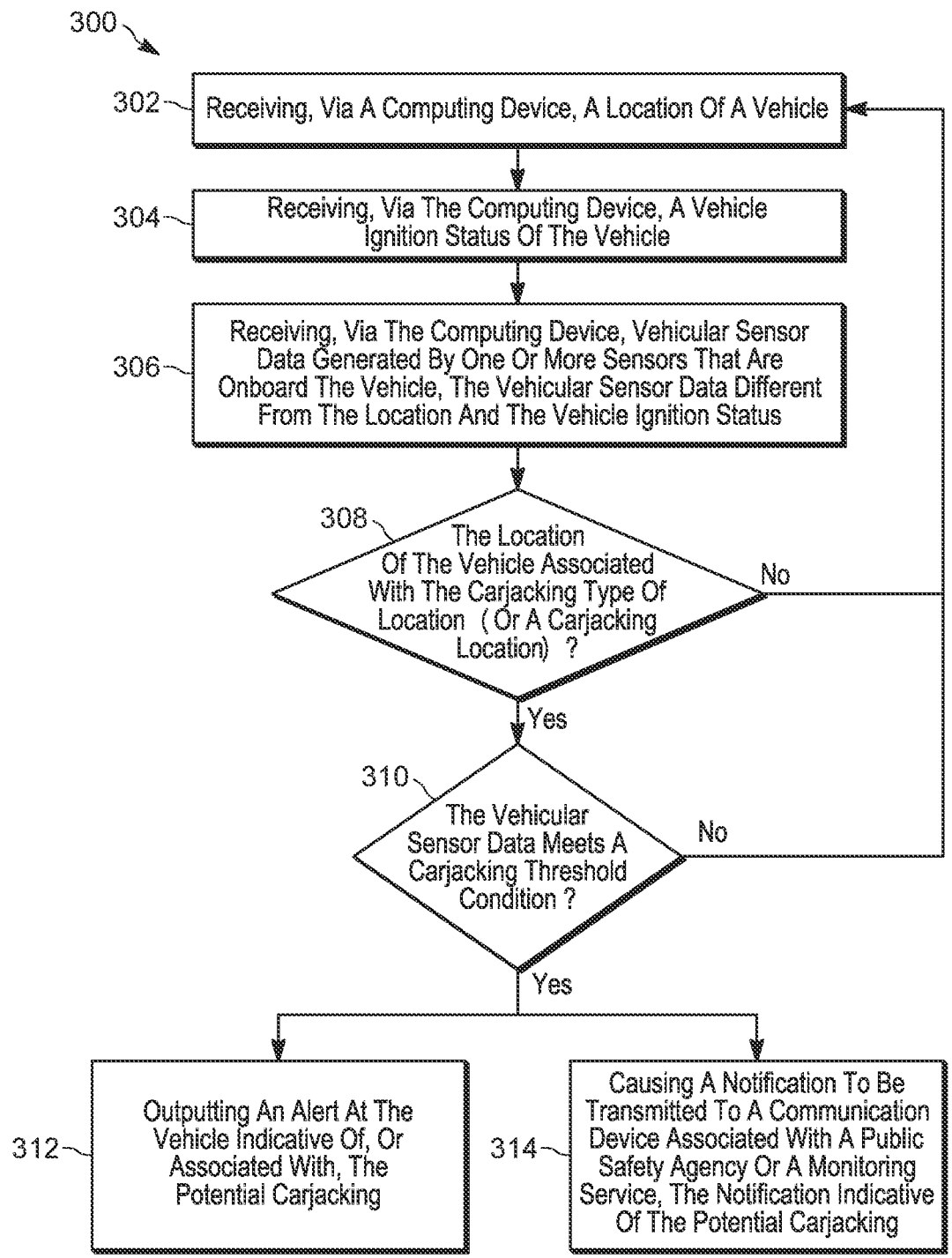
FIG. 3 is a flowchart of a method for an electronic response to a potential carjacking, in accordance with some examples.

In particular, the memory 220 stores instructions corresponding to the at least one application 222 (and the programming instructions 224) that, when executed by the controller 218, enables the controller 218 to implement functionality for an electronic response to a potential carjacking, including but not limited to, the blocks of the method set forth in FIG. 3.

Furthermore, while the programming instructions 224 are depicted as separate from the application 222, in other examples the programming instructions 224 may be a component of the application 22.

Some or all functionality described herein may occur via numerical algorithms, including, but not limited to, functionality described herein with respect to determining whether a combination of the vehicle ignition status and the vehicular sensor data meet a carjacking threshold condition and/or determining whether the location of the vehicle is associated with a carjacking type of location. However, some, or all, of such functionality may be performed by the machine learning algorithm 104.

The machine learning algorithm 104 may include, but are not limited to: a deep-learning based algorithm: a neural network: a generalized linear regression algorithm: a random forest algorithm: a support vector machine algorithm: a gradient boosting regression algorithm: a decision tree algorithm: a generalized additive model: evolutionary programming algorithms: Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public-safety environments, and the like, for example in environments in which crimes, or potential crimes, such as a carjacking may be detected. Any suitable machine learning algorithm and/or deep learning algorithm and/or neural network is within the scope of present examples, with the instructions 224 adapted accordingly.

When machine learning algorithm 104 comprise a neural network, and the like, determining whether the location of the vehicle is associated with a carjacking type of location, and/or a carjacking location, may occur on one or more layers of the neural network and determining whether a combination of a vehicle ignition status and vehicular sensor data meet a carjacking threshold condition may occur on another one or more layers of the neural network.

While details of other components of the system 100 are not depicted, such components (e.g., such as the communication devices 108, 128) may have components similar to the device 102 adapted, however, for the functionality thereof.

Attention is now directed to FIG. 3, which depicts a flowchart representative of a method 300 for an electronic response to a potential carjacking. The operations of the method 300 of FIG. 3 correspond to machine readable instructions that are executed by the device 102, and specifically the controller 218 of the device 102. In the illustrated example, the instructions represented by the blocks of FIG. 3 are stored at the memory 220 for example, as the application 222 and/or the instructions 224. The method 300 of FIG. 3 is one way that the controller 218 and/or the device 102 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 218, and/or the device 102, receives the location 114 of the vehicle 116, for example in the form of the location data 132 from the location determining device 122. The receipt of the location 114 of the vehicle 116 may occur in an on-going and/or periodic manner, for example as the vehicle 116 moves, and/or receipt of the location 114 of the vehicle 116 may occur when the vehicle 116 is below a threshold speed (e.g., 1 km/hr, 2 kms/hr, amongst other possibilities) at which carjackings are known to occur. While a speed sensor is not depicted, it is understood that the sensors 126 may comprise such a speed sensor.

At a block 304, the controller 218, and/or the device 102, receives the vehicle ignition status 134 of the vehicle 116, for example from the vehicle ignition sensor 124. The receipt of the vehicle ignition status 134 of the vehicle 116 may occur in an on-going and/or periodic manner, and/or receipt of the vehicle ignition status 134 of the vehicle 116 may occur when the vehicle ignition status 134 changes between an off-state and an on-state, and the like.

At a block 306, the controller 218, and/or the device 102, receives the vehicular sensor data 136 generated by one or more sensors 126 that are onboard the vehicle 116, the vehicular sensor data 136 different from the location 114 and/or the location data 132 and the vehicle ignition status 134. The receipt of vehicular sensor data 136 of the vehicle 116 may occur in an on-going and/or periodic manner, and/or receipt of the vehicular sensor data 136 may occur when the vehicle 116 is below the threshold speed at which carjackings are known to occur, and the like.

It is further understood that the blocks 302, 304, 306 may be performed in any suitable order and/or concurrently.

At a block 308, the controller 218, and/or the device 102, determines whether the location 114 of the vehicle 116 is associated with a carjacking type 106 of location and/or a carjacking location 107.

For example, as has already been described, the location 114 of the vehicle 116 may be compared to the carjacking types 106 of locations, for example via a database lookup at the carjacking types 106 of locations, and/or via the machine learning algorithm 104, to determine the location 114 of the vehicle 116 comprises a carjacking type 106 of location, such as a location type at which vehicles stop or slow down, while the vehicle ignition status is in an on-state.

Alternatively, and/or in addition, the controller 218, and/or the device 102, may determine whether the location 114 of the vehicle 116 is associated with a carjacking location 107, such as a location that is statistically high in carjackings, and the like and/or at which a carjacking rate is above a threshold carjacking rate. In these examples, the location 114 may be associated with a carjacking location 107 when the location 114 is within a given distance of a carjacking location 107, such as 1 meter, 5 meters, or 10 meters, amongst other possibilities.

At a block 310, the controller 218, and/or the device 102, determines whether the combination of the vehicle ignition status 134 and the vehicular sensor data 136 meet a carjacking threshold condition 138. Examples of carjacking threshold conditions 138 are described in more detail below.

It is further understood that the blocks 308, 310 may be performed in any suitable order. In some examples, as depicted, the block 308 may be implemented prior to the block 310 as a carjacking threshold condition 138 may depend on the location 114 of the vehicle 116 and/or a carjacking type 106 of the location 114 (and/or whether the location 114 is a carjacking location 107), as described in more detail below.

When a "NO" decision occurs at one or more of the blocks 308, 310 (e.g., the location 114 of the vehicle 116 is not associated with a carjacking type 106 (and the location 114 of the vehicle 116 is not associated with a carjacking location 107), and and/or a carjacking threshold condition 138 is not met), the controller 218, and/or the device 102 may continue to implement the method 300 at the block 302 (as depicted) and/or at any other suitable block of the method 300.

When both the location 114 of the vehicle 116 is associated with a carjacking type 106 of location (e.g., or a carjacking location 107) and the carjacking threshold condition 138 is met (e.g., a "YES" decision at both the block 308 and the block 310), the controller 218, and/or the device 102 may implement one or more of a block 312 and a block 314.

At a block 312, the controller 218, and/or the device 102, outputs the alert 140 at the vehicle 116 indicative of, or associated with, the potential carjacking. For example, the alert 140 may be output at the alert device 130 and/or at the communication device 128, and may comprise an audible and/or a visual alert, as has been previously described. Alternatively, and/or in addition, the alert 140 may comprise a haptic alert (e.g., via a haptic component of the communication device 128 and/or the alert device 130, such as a haptic motor incorporated into a steering wheel and/or driver seat of the vehicle 116).

At a block 314, the controller 218, and/or the device 102, causes the notification 142 to be transmitted to a communication device 108 associated with a public safety agency or a monitoring service, the notification 142 indicative of the potential carjacking, as has been previously described.

It is further understood that only one of the blocks 312, 314 may be implemented, or both the blocks 312, 314 may be implemented, which may depend on capabilities of the vehicle 116 and/or the device 102, and/or whether a public-service entity associated with the location 114 has agreed to receive notifications of potential carjackings, and the like and/or whether an owner, and the like, of the vehicle 116 has engaged the monitoring service.

For example, the device 102 may maintain a list of locations (e.g., at the carjacking types 106 of locations, and/or at the carjacking locations 107, and/or at the memory 220) at which public-service entities have agreed to receive notifications of carjackings, as well as contact information for communication devices thereof (e.g., PSAP contact phone numbers, including, but not limited to "911") and the notification 142 may be transmitted to the communication device 108-1 based on the location 114 associated with the public-service entity that operates the communication device 108-1 having agreed to receive notifications of potential carjackings.

Alternatively, and/or in addition, the device 102 may store an indication of whether or not an owner, and the like, of the vehicle 116 has engaged the monitoring service, and the notification 142 may be transmitted to the communication device 108-2 based on the owner, and the like, of the vehicle 116 having engaged the monitoring service (e.g., such as having paid for a vehicle monitoring subscription).

The method 300 may include further features and/or aspects as is next described.

For example, in some implementations, the method 300 may further comprise the controller 218 and/or the device 102: prior to outputting the alert 140 or causing the notification 142 to be transmitted, providing the location 114 to the second computing device 110 in communication with the camera 112, which is understood to be external to, and separate from, the vehicle 116 at the location 114; and receiving, from the second computing device 110, based on images from the camera 112 external to the vehicle 116 at the location 114, a confirmation that the carjacking threshold condition 138 has been met, wherein the outputting the alert 140 or causing the notification 142 to be transmitted occurs based on receiving the confirmation.

For example, the second computing device 110 may have more processing power available to process images than the device 102 (e.g., when the device 102 comprises a computing device incorporated at the vehicle 116). However, the second computing device 110 may not be "always" processing and/or analyzing image data from the camera 112 to search for crimes such as carjackings. Hence, when both the location 114 of the vehicle 116 is associated with a carjacking type 106 of location (or a carjacking location 107) and the carjacking threshold condition 138 is met (e.g., a "YES" decision at the blocks 308, 310), device 102 may provide the location 114 to the second computing device 110, and optionally a make, model and/or color of the vehicle 116, and/or any images of the person 120 that might have been acquired by one or more of the cameras 126c, to cause the second computing device 110 to begin processing and/or analyzing image data from the camera 112 to determine whether a carjacking is occurring in association with the vehicle 116. The location 114 may enable the second computing device 110 to identify the camera 112 as being camera at the location 114, for example as the second computing device 110 may be in communication with a plurality of cameras at a plurality of locations. The make, model and/or color of the vehicle 116, and/or any images of the person 120 that might have been acquired by one or more of the cameras 126c may enable the second computing device 110 to identify the vehicle 116 and/or the person 120, for example when there are a plurality of vehicles and/or a plurality of persons in the image data from the camera 112. Regardless, it is understood that the second computing device 110 may comprise a video analytics engine configured to identify carjackings in image data.

Hence, when the second computing device 110 determines from image data from the camera 112 that a carjacking is occurring in association with the vehicle 116, the second computing device 110 may return a confirmation of a carjacking and/or a confirmation of a carjacking threshold condition 138 being met to the device 102.

Alternatively, and/or in addition, the second computing device 110 may return image data from the camera 112 to the device 102, and the device 102 may process and/or analyze the image data to confirm that a carjacking threshold condition 138 is being met.

Regardless, in these examples the block 312 and/or the block 314 may not be implemented until a confirmation of a carjacking and/or a confirmation of a carjacking threshold condition 138 being met is determined based on image data from the camera 112.

In some implementations, the method 300 may further comprise the controller 218 and/or the device 102: providing the driver 118 of the vehicle 116 with an electronic selectable option to cancel one or both of the alert 140 and the notification 142. For example, the alert 140 may be provided, which indicates the potential carjacking and the driver 118 may experience the alert 140 and determine that no carjacking is occurring: the electronic selectable option may comprise an electronic button at a display screen of the alert device 130, and the like, which, when actuated, causes the alert 140 to be cancelled.

Furthermore, the electronic selectable option may be provided prior to transmission of the notification 142, and actuation of the electronic selectable option may cause the notification 142 to be cancelled.

In some examples, a confirmation electronic selectable option may be provided prior to transmission of the notification 142 and actuation of the confirmation electronic selectable option may cause the notification 142 to be transmitted; in such examples, the notification 142 may not be transmitted until the confirmation electronic selectable option is actuated to confirm that the notification 142 is to be transmitted. Hence, in these examples, the driver 118 may experience the alert 140 and may confirm that a carjacking is occurring and actuate the confirmation electronic selectable option to cause the notification 142 to be transmitted.

Examples of carjacking threshold conditions 138 are next described.

In each of the following examples, unless otherwise indicated, a vehicle ignition status 134 and vehicular sensor data 136 meeting a carjacking threshold condition 138 may include, but is not limited to: driver occupancy status data indicating that the driver 118 is in a driver seat of the vehicle 116 (e.g., detected via the occupancy sensor 126o and/or an interior camera 126c); and/or image data from the one or more cameras 126c indicating that the person 120 is not a public safety officer and/or is not wearing a public-safety uniform and/or is not wearing a badge and/or is not a valet and/or is not wearing a valet uniform and/or is not wearing a valet nametag, and the like.

Put another way, in the carjacking threshold conditions 138 next described, image data from the one or more cameras 126c may be processed and/or analyzed by the controller 218 and/or the device 102 (e.g., via one or more layers of a neural network of the machine learning algorithm 104) to confirm that the person 120 is not a public-safety officer, such as a police officer, or a valet, and/or any other suitable type of person that may have been previously determined to lawfully approach a vehicle when the vehicle is stopped, and/or traveling below a threshold velocity, and the like.

Furthermore, while the following examples are described with respect to only one person 120 attempting a carjacking via a driver side door of the vehicle 116, in other examples, more than one person 120 may attempt a carjacking via a driver side door and/or a passenger side door of the vehicle 116, and/or using any suitable front and/or rear door of the vehicle 116. In examples where a passenger is located in a passenger side seat, a presence of the passenger may be detected by a passenger occupancy sensor. Furthermore, while the following examples are described with respect to the person 120 attempting a carjacking via a driver side door of the vehicle 116, in other examples (e.g., alternatively, or in addition) a person (or persons) may attempt to carjack the vehicle 116 by climbing onto the vehicle 116 (e.g., from any suitable direction), shaking the vehicle 116, brandishing weapons, and the like, at a distance while approaching the vehicle 116, using another vehicle (and/or vehicles) as obstacles to prevent the 116 vehicle from escaping, using another vehicle (and/or vehicles) to run the vehicle 116 off the road, and the like, amongst other possibilities.

It is further understood in the following examples, the controller 218 and/or the device 102 has determined (e.g., at the block 308) that the location 114 of the vehicle 116 is a carjacking type 106 type of location (and/or or the controller 218 and/or the device 102 has determined that the location 114 of the vehicle 116 is a carjacking location 107).

It is further understood in the following examples, the controller 218 and/or the device 102 has determined that vehicle 116 is stopped and/or traveling below a threshold velocity, and the like.

In one particular example of a carjacking threshold condition 138, the one or more sensors 126 may comprise the exterior driver door handle sensor 126d-1, the vehicular sensor data 136 may comprise external driver door handle sensor data from the exterior driver door handle sensor 126d-1, and the combination of the vehicle ignition status 134 and the vehicular sensor data 136 meeting a carjacking threshold condition 138 may comprise: the vehicle ignition status 134 being in an on-state: and the exterior driver door handle sensor data indicating a driver door being opened. In these examples, a potential carjacking may be occurring when the vehicle 116 is stopped and the person 120 attempts to open the driver side door of the vehicle 116.

In another particular example of a carjacking threshold condition 138, the one or more sensors 126 may comprise one or more cameras 126c onboard the vehicle 116, the vehicular sensor data 126 may comprise image data from the one or more cameras 126c, and the combination of the vehicle ignition status 134 and the vehicular sensor data 126 meeting the carjacking threshold condition 138 may comprise: the vehicle ignition status 134 being in an on-state: and the image data indicating a person approaching a driver side door of the vehicle 116 (e.g., who is not an officer or a valet). In these examples, a potential carjacking may be occurring when the vehicle 116 is stopped and the person 120 the approaches the vehicle 116 for example at the driver side door of the vehicle 116. As has previously been mentioned, in these examples (e.g., and other examples), the method 300 may further comprise the controller 218 and/or the device 102 determining, using video analytics associated with the one or more cameras 126c, that the person approaching the driver side door of the vehicle 116 is not a public-safety officer or a valet. It is further understood that such video analytics may be implemented via the machine learning algorithm 104, however in other examples, a camera 126c may be configured to implement such video analytics. Put another way, one or more of the device 102 and a camera 126c may comprise a video analytics engine.

In yet further examples, the person 120 approaching the vehicle 116 may be detected via one or more of the perimeter sensors 126p.

In another particular example of a carjacking threshold condition 138, the one or more sensors 126 may comprise: the exterior driver door handle sensor 126d-1 and one or more cameras 126c on-board the vehicle 116, and the vehicular sensor data 126 may comprise: external driver door handle sensor data from the exterior driver door handle sensor 126d-1 and image data from the one or more cameras 126c, and the combination of the vehicle ignition status 134 and the vehicular sensor data 126 meeting the carjacking threshold condition 138 may comprise: the vehicle ignition status 134 being in an on-state: the exterior driver door handle sensor data indicating a driver side door being opened: and the image data indicating a person approaching the driver side door of the vehicle 116 who is not a public-safety officer or a valet.

In another particular example of a carjacking threshold condition 138, the one or more sensors 126 may comprise one or more of the rear bumper impact sensor 126b-1 and the front bumper impact sensor 126b-2, the vehicular sensor data 126 may comprise impact sensor data from the one or more of the rear bumper impact sensor 126b-1 and the front bumper impact sensor 126b-2, and the combination of the vehicle ignition status 134 and the vehicular sensor data 126 meeting the carjacking threshold condition 138 may comprise: the vehicle ignition status 134 being in an on-state; and the impact sensor data indicating a detected impact. In these examples, a potential carjacking may be occurring when other vehicles bump the vehicle 116 from behind and/or the front, as detected by one or more of the rear bumper impact sensor 126b-1 and the front bumper impact sensor 126b-2: in some of these examples, a potential carjacking may be occurring when other vehicles bump the vehicle 116 from behind and/or the front, and when a magnitude of the bump is above a threshold magnitude (e.g., such as a bump load of 100 N (newtons), 1000 N, amongst other possibilities) as detected by one or more of the rear bumper impact sensor 126b-1 and the front bumper impact sensor 126b-2.

In another particular example of a carjacking threshold condition 138, the one or more sensors 126 may comprise one or more cameras 126c onboard the vehicle 116, the vehicular sensor data 126 may comprise image data from the one or more cameras 126c, and the combination of the vehicle ignition status 134 and the vehicular sensor data 126 meeting the carjacking threshold condition 138 may comprise: the vehicle ignition status 134 being in an on-state: and the image data indicating the person 120 approaching a driver side door of the vehicle 116 with one or more of a weapon, and an adorned mask, and the like, and/or any other given object and/or article of clothing. In these examples, a potential carjacking may be occurring when the person 120 approaches the vehicle 116 at the driver side door holding a weapon and/or wearing a mask, and the like.

In another particular example of a carjacking threshold condition 138, the one or more sensors 126 may comprise one or more of an environmental condition sensor and a vehicular condition sensor (e.g., one or more of the other sensors 126z), the vehicular sensor data 126 may comprise condition data from one or more the environmental condition sensor and the vehicular condition sensor, and the combination of the vehicle ignition status 134 and the vehicular sensor data 126 meeting the carjacking threshold condition 138 may comprise: the vehicle ignition status 134 being in an on-state: and the condition data indicative of a driver of the vehicle 116 not needing help in overcoming one or more of environmental conditions and vehicular conditions. For example, the condition data may indicate that it may be raining at the vehicle 116 and/or damage may have occurred to the vehicle 116, such as a cracked windshield, but (e.g., as optionally determined in combination with other sensor data 126, such as image data from the cameras 126c), the driver 118 does not need help in overcoming the environmental conditions and/or vehicular conditions. Put another way, in instances where it is raining hard and the driver 118 has pulled over due to visibility issues, and/or in instances where a windshield of the vehicle 116 may have been damaged, for example due to impact with a bird, and the like, the sensor data 126 may indicate that the driver 118 needs help or does not need help in overcoming the environmental conditions and/or vehicular conditions.

For example, in instances where the driver 118 needs help in overcoming the environmental conditions, which may be indicated by rising water at the location 114 as detected by an environmental condition sensor (and/or using image data from the cameras 126c), the person 120 may be an emergency worker coming to help and/or rescue the driver 118. Conversely, in instances where the driver 118 does not need help in overcoming the environmental conditions, which may be indicated by raining, but no rising water at the location 114 as detected by an environmental condition sensor (and/or using image data from the cameras 126c), the person 120 may be attempting to carjack the vehicle 116.

Similarly, in instances where the driver 118 needs help in overcoming the vehicular conditions, which may be indicated by the windshield being so damaged the driver 118 cannot drive the car, and/or the driver 118 being injured (e.g., as detected by the health sensor 126h), the person 120 may be an emergency worker and/or emergency medical technician coming to help and/or rescue the driver 118. Conversely, in instances where the driver 118 does not need help in overcoming the vehicular conditions, which may be indicated by the windshield being damaged but so that the driver 118 can still drive the car, and/or the driver 118 not being injured (e.g., as detected by the health sensor 126h), the person 120 may be attempting to carjack the vehicle 116.

Indeed, health data from the health sensor 126h may be used in suitable manner to determine whether a carjacking threshold condition 138 is met.

For example, a carjacking threshold condition 138 may be met when a front or rear impact sensor 126b-1 detects a bump, the driver 118 is thereafter incapacitated and/or unconscious, as detected by the health sensor 126h, and thereafter the driver side door is opened, as detected by the exterior driver door handle sensor 126d-1, and the person 120 is not a public-safety officer and/or a valet as determined via the one or more cameras 126c. Such a carjacking threshold condition 138 may further include image data from an interior camera 126c indicating that the driver 118 is slumped over a steering wheel of the vehicle 116.

Such an example further illustrates that carjacking threshold condition 138 may depend on a temporal order in which detection of certain sensor data at given respective sensors 126 occur.

While heretofore, examples of carjacking threshold conditions 138 being met have been described in which it is understood the vehicle ignition status 134 is in an on-state, and the driver 118 is in the vehicle 116, in other examples of carjacking threshold conditions 138 being met the vehicle ignition status 134 may be in an off-state and the driver 118 may be external to the vehicle 116.

For example, the method 300 may further comprise the controller 218 and/or the device 102: determining that the carjacking threshold condition 138 is met when the vehicle ignition status 134 is in an off-state, and the vehicular sensor data 126 indicates the driver is within the vehicle 116 or proximately located to the vehicle 116 (e.g., as detected via the cameras 126c and/or the perimeter sensors 126p and/or the occupancy sensor 126o) and the person 120 who is not a public safety officer or a valet is approaching the vehicle 116 (e.g., as detected via the cameras 126c and/or the perimeter sensors 126p): and determining that the location 114 of the vehicle 116 is associated with the carjacking type 106 of location (or a carjacking location 107) may comprise determining that the location 114 of the vehicle 116 is one or more of a gas station, an automated teller machine and a parking lot, and the like.

Put another way, when the location 114 of the vehicle 116 is a gas station, an automated teller machine, a parking lot, and the like, such locations may comprise carjacking types 106 of locations (e.g., or carjacking locations 107), and furthermore, at such locations the driver 118 may have turned the vehicle 116 off and may be in the vehicle 116, or may have exited the vehicle 116, but may be proximal to the vehicle 116, when the person 120 attempts to carjack the vehicle 116.

Such an example further illustrates that the carjacking condition threshold condition 138 may be dependent on a location of the vehicle 116. For example, when the location 114 of the vehicle 116 is an intersection, an associated carjacking condition threshold condition 138 may be met when the vehicle ignition status 134 is in an on-state, but not an off-state, and the driver 118 is in the vehicle 116, but not outside the vehicle 116. However, when the location 114 of the vehicle 116 is a gas station, an associated carjacking condition threshold condition 138 may be met when the vehicle ignition status 134 is in an off-state, but not an on-state, and the driver 118 is in the vehicle 116 or outside/proximal the vehicle 116. However, such examples do not exclude a carjacking threshold condition 138 being met when the vehicle ignition status 134 is in an on-state or an off-state and the driver 118 is in the vehicle 116 or outside the vehicle 116, regardless of the location 114 of the vehicle 116. Indeed, any suitable carjacking threshold conditions 138 are within the scope of the present specification and such carjacking threshold conditions 138 may or may not be location dependent.

In other examples, the method 300 may further comprise the controller 218 and/or the device 102 weighting the vehicular sensor data 126 based on the location 114. For example, when the location 114 comprises a self-serve gas station, image data from the one or more cameras 126c indicating that the person 120 approaching is approaching the vehicle 116 may be weighted (e.g., relatively) higher than when the location 114 comprises a full-service gas station (e.g., the person 120 may be a service attendant at the full-service gas station who may or may not be wearing a uniform and/or a nametag, and the like). Similarly, when the location 114 comprises a stop light, image data from the one or more cameras 126c indicating that the person 120 approaching is approaching the vehicle 116 may be weighted (e.g., relatively) higher than perimeter data from the perimeter sensors 126p, which may not distinguish between the person 120 and a bicycle alongside the vehicle 116 (e.g., presuming that bicycles are not generally used in carjackings).

While determination of whether or not the location 114 comprises a carjacking type 106 of location (e.g., or a carjacking location 107), and determination of whether or not a carjacking threshold condition 138 has been met, has been heretofore described with respect to a database lookup and/or the machine learning algorithm 104, such determinations may alternatively occur via assigning numeric values to such determinations, for example via one or more modules of the application 222, combining such numeric values, and comparing a total numeric value to a threshold value.

For example, the method 300 may further comprise the controller 218 and/or device 102: assigning a first numeric value to the location 114 as a function of a risk of carjacking at the location 114 as indicated by the carjacking types 106 of locations (e.g., or by the carjacking locations 107); assigning a second numeric value to the vehicle ignition status 134 indicative of a risk of the potential carjacking indicated by the vehicle ignition status 134; assigning a third numeric value to the sensor data 126 indicative of a risk of the potential carjacking indicated by the sensor data 126; combining the first numeric value, the second numeric value and the third numeric value into a final numeric value: comparing the final numeric value to a threshold numeric value; and when final numeric value exceeds the threshold numeric value, determining that both the location 114 of the vehicle 116 is associated with a carjacking type 106 of location (e.g., or a carjacking location 107) and the carjacking threshold condition 138 is met. Such an example may further include weighting the numeric values when combining into the final numeric value.

For example, the carjacking types 106 of locations (e.g., or the carjacking locations 107) may indicate that the location 114 is associated with an 80% chance of carjacking: hence the first numeric value may be 80%, which may be weighted at 0.3 of the final numeric value.

Similarly, the vehicle ignition status 134 being in an on-state may indicate a 60% chance of carjacking: hence the second numeric value may be 60%, which may be weighted at 0.2 of the final numeric value.

Similarly, the combination of the sensor data 126 may indicate a 90% chance of carjacking: hence the third numeric value may be 90%, which may be weighted at 0.5 of the final numeric value.

As such, in this example, the final numeric value may be determined from the sum of the weighted numeric values, or (80%×0.3)+(60%×0.2)+(90%×0.5)=81%.

The threshold numeric value may be 75%, 80%, 90%, amongst other possibilities. However, assuming the threshold numeric value is 80%, the above final numeric value of 81% exceeds the threshold numeric value of 80%, and hence the block 312 and/or the block 314 may be implemented.

Furthermore, the blocks 312, 314 may be associated with different respective threshold numeric values. For example, a threshold numeric value associated with the block 314, in which the notification 142 is transmitted, may be higher than a threshold numeric value associated with the block 312, in which the alert 140 is provided. For example, a threshold numeric value associated with the block 314 may be 95%, and a threshold numeric value associated with the block 312 may be 80%. Using the above final numeric value of 81%, in these examples, as 81% is less than the threshold numeric value associated with the block 314 of 95%, the notification 142 may not be transmitted, but as 81% is greater than the threshold numeric value associated with the block 312 of 80% the alert is provided.

Hence, it is understood that a higher threshold numeric value may be used to contact a public safety agency and/or a monitoring service than a lower threshold numeric value used to alert the driver 118 to a potential carjacking.

Indeed, such examples further illustrate that different carjacking threshold conditions 138 may be used to implement the block 312 and the block 314. For example, to provide the alert 140 at the block 312, image data from the one or more cameras 126c may indicate that a person 120 is approaching the vehicle 116 (e.g., at an intersection) who is not an officer or a valet. However, to cause the notification 142 to be transmitted at the block 314, image data from the one or more cameras 126c may indicate that a person 120 is approaching the vehicle 116 (e.g., at an intersection) who is not an officer or a valet and is also carrying a weapon and/or wearing a mask, and the like. In examples, where the alert 140 is provided but the notification 142 is not transmitted when the alert 140 is provided, an electronic selectable option may be provided at the alert device 130 and/or the communication device 128, which, when actuated by the driver 118, may cause the notification 142 to be transmitted (e.g., after the driver 118 experiences the alert 140 and confirms the potential carjacking).

Indeed, different carjacking threshold conditions 138 may be used to provide the notification 142 to the communication device 108-1 associated with the public-safety agency or to the communication device 108-2 associated with the monitoring service. For example, to cause the notification 142 to be transmitted to the communication device 108-2 associated with the monitoring service, image data from the one or more cameras 126*c* may indicate that a person 120 is approaching the vehicle 116 (e.g., at an intersection) who is not an officer or a valet. However, to cause the notification 142 to be transmitted to the communication device 108-1 associated with the public-safety agency, image data from the one or more cameras 126*c* may indicate that a person 120 is approaching the vehicle 116 (e.g., at an intersection) who is not an officer or a valet and is also carrying a weapon and/or wearing a mask, and the like.

Similarly, returning to the aforementioned numeric values, a first threshold numeric value causing the notification 142 to be transmitted to the communication device 108-1 associated with the public-safety agency, may be higher than a second threshold numeric value causing the notification 142 to be transmitted to the communication device 108-2 associated with the monitoring service. For example, a first threshold numeric value causing the notification 142 to be transmitted to the communication device 108-1 associated with the public-safety agency may be 98% (e.g., such as 85%, or 95%, amongst other possibilities), and a second threshold numeric value causing the notification 142 to be transmitted to the communication device 108-2 associated with the monitoring service may be 90% (e.g., such as 70%, or 80%, amongst other possibilities). Hence, a higher threshold numeric value may be used to notify a public-safety agency of a potential carjacking than a lower threshold numeric value used to notify monitoring service of a potential carjacking.

Figure 4:
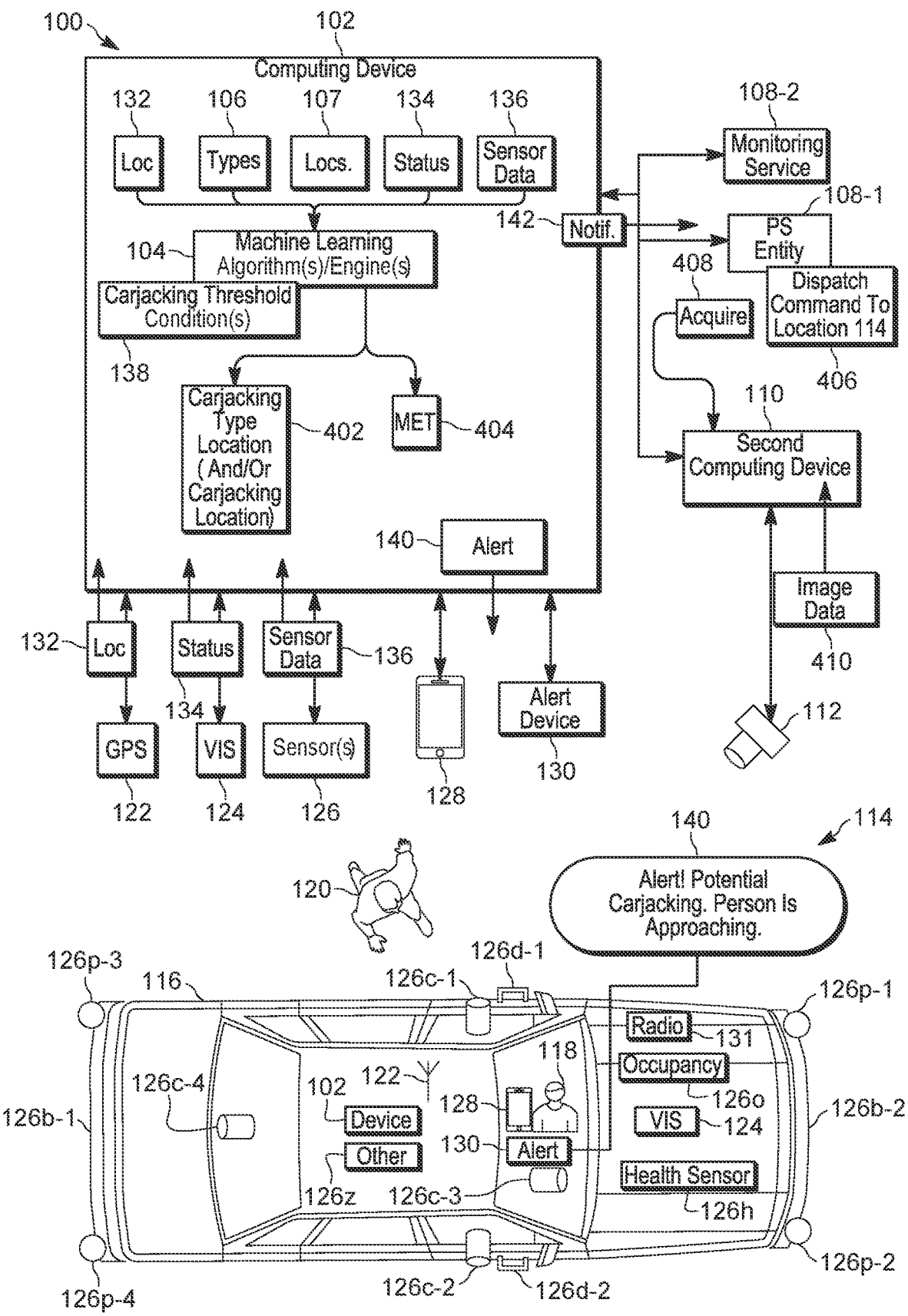
FIG. 4 depicts aspects of a method for an electronic response to a potential carjacking being implemented by a computing device of the system of FIG. 1, in accordance with some examples.
Figure 5:
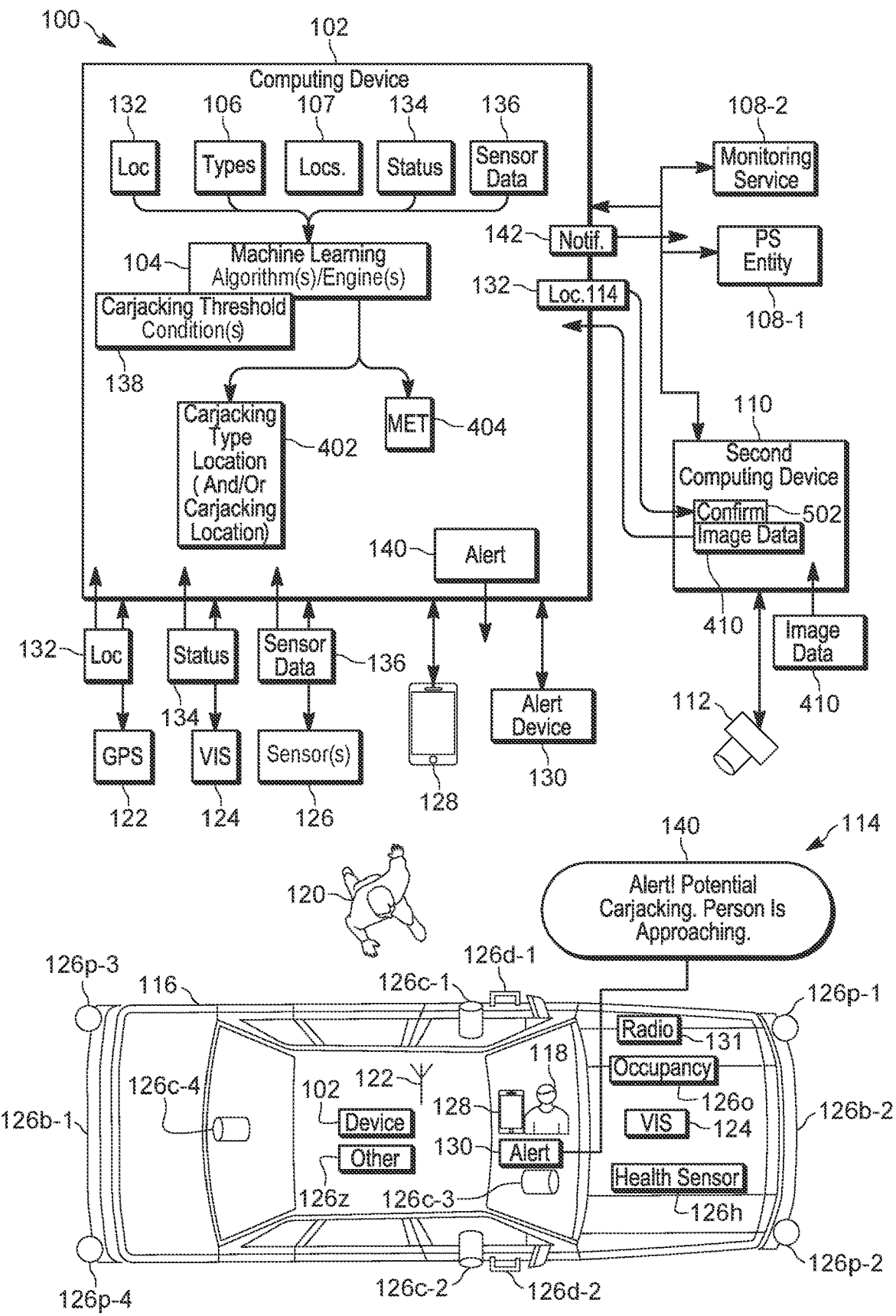
FIG. 5 depicts further aspects of the method for an electronic response to a potential carjacking, in accordance with some examples.

Aspects of the method 300 are next described with respect to FIG. 4 and FIG. 5, which are substantially similar to FIG. 1, with like components having like numbers.

With attention first directed to FIG. 4, the device 102 is depicted as receiving (e.g., at the blocks 302, 304, 306 of the method 300), the location 114 (e.g., in the form of the location data 132), the carjacking types 106 of locations (and, as depicted, alternatively and/or additionally, the carjacking locations 107), the vehicle ignition status 134 and the vehicular sensor data 136, which are input to the machine learning algorithm 104.

The machine learning algorithm 104 determines (e.g., at the blocks 308, 310 of the method 300) whether the location 114 of the vehicle 116 is a carjacking type 106 of location (and/or a carjacking location 107) and whether a combination of the vehicle ignition status 134 and the vehicular sensor data 136 meet a carjacking threshold condition 138 using, for example, respective layers of a neural network.

As further depicted, the machine learning algorithm 104 outputs a result 402 indicating that the location 114 of the vehicle 116 is associated with a carjacking type 106 of location (and/or a carjacking location 107), and a result 404 indicating that a carjacking threshold condition 138 is met (e.g., "YES" decisions at both the blocks 308, 310). Hence, the alert 140 is provided via the alert device 130 (e.g., at the block 312), for example in the form of a visual or audible announcement of "Alert! Potential Carjacking. Person Is Approaching." While not depicted, when the alert 140 is an audible announcement, the alert 140 may be provided by an external speaker, external to the vehicle 116, such as a speaker of the camera 112. Hence, an audible announcement of the alert 140 may be provided by an internal speaker (e.g., of the alert device 130) that is internal to the vehicle 116 and/or an external speaker (e.g., of the camera 112) that is external to the vehicle 116. In particular, when the alert 140 is provided at an external speaker, the alert 140 may cause a potential carjacking not to occur as the person 120 (e.g., the potential carjacker) may hear the alert 140 and decide not to attempt a carjacking: in these examples, the device 102 may communicate with the second communication device 110 to provide the alert 140 (e.g., by providing text and/or an audio file of the announcement that is to be played by a speaker of the camera 112; when text is provided, it is understood that the second communication device 110 and/or the camera 112 may convert the text to audio (e.g., using a text-to-voice engine, and the like), to be played by a speaker of the camera 112).

Similarly, the notification 142 is transmitted (e.g., at the block 314) to one or more of the communication devices 108. As depicted, presuming the communication device 108-1 receives the notification 142, the communication device 108-1, and/or an operator thereof (not depicted) may cause a dispatch command 406 to be generated to cause a police vehicle to be dispatched to the location 114. Alternatively, and/or in addition, the communication device 108-1, and/or an operator thereof (not depicted) may cause an acquire command 408 to be generated and provided to the second computing device 110 to cause image data 410 from the camera 112 to be acquired and/or stored to confirm the carjacking (e.g., prior to the dispatch command 406 being issued) and/or to acquire evidence of the carjacking.

Attention is next directed to FIG. 5, which is substantially similar to FIG. 4, with like components having like numbers, however in FIG. 5, the device 102 is providing the location data 132 indicating the location 114 to the second computing device 110, which causes the image data 410 from the camera 112 to be acquired to confirm the potential carjacking at the location 114, and a confirmation 502 is provided back to the device 102.

Alternatively, and/or in addition, as is also depicted in FIG. 5, the image data 410 may be provided to the device 102 such that the device 102 may confirm, based on the image data 410, the potential carjacking. For example, when the machine learning algorithm 104 outputs the result 402, 404, prior to providing one or more of the alert 140 and notification 142, the device 102 provides the location data 132 indicating the location 114 to the second computing device 110, which may return the confirmation 502 and/or the image data 410, and one or more of the confirmation 502 and/or the image data 410 may be used by the device 102 (e.g., using any suitable video analytics engine) to confirm the potential carjacking.

Based on the carjacking being confirmed, the device 102 may provide one or more of the alert 140 and notification 142.

Furthermore, it is understood that the carjacking locations 107 may be updated based on a confirmation of a carjacking at the location 114. For example, the location 114 (e.g., in form of GPS coordinates, triangulation data, beacon data, and the like) may be used to update the carjacking locations 107 to indicate a higher risk of carjackings at the location 114 than currently be indicated by the carjacking locations 107.

Similarly, it is understood that the carjacking types 106 of locations may be updated based on a confirmation of a carjacking at the location 114. For example, when a type of the location 114 (e.g., as indicated by map, database, and the like) does not appear in the carjacking types 106 of locations (e.g., the result 402 may be based on the carjacking locations 107), the type of the location 114 may be used to update the carjacking types 106 of locations as another type of location where carjackings may occur. For example, when the location 114 is proximal a yield sign, and the like, and "Yield Signs" are not indicated by the carjacking types 106 of locations, "Yield Signs" may be added to the carjacking types 106 of locations.

Similarly, it is understood that the machine learning algorithm 104 may be operated in training mode in which a machine learning feedback loop may be implemented using a confirmation of a carjacking at the location 114. For example, the location 114 (e.g., in the form of the location data 132), the carjacking types 106 of locations and/or the carjacking locations 107, the vehicle ignition status 134 and the vehicular sensor data 136 may be used as training input data and the results 402, 404 may be used training output data in such a machine learning feedback loop. Furthermore, the training input data and/or the training output data may be labelled to indicate that such data comprises a positive training example and/or a positive training set to better train the machine learning algorithm 104 to determine whether locations of vehicles comprise carjacking types of locations and/or to determine whether a carjacking threshold condition 138 is met by a combination of vehicle ignition status and vehicular sensor data.

Alternatively, and/or in addition, the machine learning feedback loop may be implemented when it is determined that carjacking did not occur at the location 114. For example, the aforementioned training input data and/or the training output data may be labelled to indicate that such data comprises a negative training example and/or a negative training set to better train the machine learning algorithm 104 to determine whether locations of vehicles comprise carjacking types of locations and/or to determine whether a carjacking threshold condition 138 is met by a combination of vehicle ignition status and vehicular sensor data.

Furthermore, once the carjacking types 106 of locations and/or the carjacking locations 107 are updated and/or the machine learning algorithm 104 is further trained, the carjacking types 106 of locations and/or the carjacking locations 107 and/or the machine learning algorithm 104 (e.g., and/or neural network layers and/or classifiers thereof) may be shared with other computing devices (e.g., associated with other vehicles) implementing the method 300 such that the method 300 may be better performed at such other computing devices.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, cannot implement a machine learning algorithm and/or engine, nor process sensor data, and the like).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

Furthermore, a device provided herein may include a housing that contains at least some of the components of the device; however in some alternative examples a device may include components not all contained in a single housing, but rather within two or more different housings.

The terms "coupled", "coupling" or "connected" as used herein can have several different meanings depending on the context, in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for an electronic response to a potential carjacking, the method comprising:
   receiving, via a computing device, a location of a vehicle;
   receiving, via the computing device, a vehicle ignition status of the vehicle;
   receiving, via the computing device, vehicular sensor data generated by one or more sensors that are onboard the vehicle, the vehicular sensor data different from the location and the vehicle ignition status;
   determining, via the computing device, whether the location of the vehicle is associated with a carjacking type of location;
   determining, via the computing device, whether a combination of the vehicle ignition status and the vehicular sensor data meet a carjacking threshold condition; and
   when both the location of the vehicle is associated with the carjacking type of location and the carjacking threshold condition is met, one or more of:
      outputting an alert at the vehicle indicative of, or associated with, the potential carjacking; and
      causing a notification to be transmitted to a communication device associated with a public safety agency or a monitoring service, the notification indicative of the potential carjacking.

2. The method of claim 1, further comprising:
   prior to outputting the alert or causing the notification to be transmitted, providing the location to a second computing device in communication with a camera external to, and separate from, the vehicle at the location; and
   receiving, from the second computing device, based on images from the camera external to the vehicle at the location, a confirmation that the carjacking threshold condition has been met,
   wherein the outputting the alert or causing the notification to be transmitted occurs based on receiving the confirmation.

3. The method of claim 1, wherein the location of the vehicle associated with the carjacking type of location comprises a location type where vehicles stop or slow down, while the vehicle ignition status is in an on-state.

4. The method of claim 1, wherein the one or more sensors comprise an exterior driver door handle sensor, the vehicular sensor data comprises external driver door handle sensor data from the exterior driver door handle sensor, and the combination of the vehicle ignition status and the vehicular sensor data meeting the carjacking threshold condition comprises:
   the vehicle ignition status being in an on-state; and
   the exterior driver door handle sensor data indicating a driver door being opened.

5. The method of claim 1, wherein the one or more sensors comprises one or more cameras onboard the vehicle, the vehicular sensor data comprises image data from the one or more cameras, and the combination of the vehicle ignition status and the vehicular sensor data meeting the carjacking threshold condition comprises:
the vehicle ignition status being in an on-state; and
the image data indicating a person approaching a driver side door of the vehicle.

6. The method of claim 5, further comprising, determining, using video analytics associated with the one or more cameras, that the person approaching the driver side door of the vehicle is not a public-safety officer.

7. The method of claim 1, wherein the one or more sensors comprises: an exterior driver door handle sensor and one or more cameras on-board the vehicle,
wherein the vehicular sensor data comprises: external driver door handle sensor data from the exterior driver door handle sensor and image data from the one or more cameras, and
wherein the combination of the vehicle ignition status and the vehicular sensor data meeting the carjacking threshold condition comprises:
the exterior driver door handle sensor data indicating a driver side door being opened;
the vehicle ignition status being in an on-state; and
the image data indicating a person approaching the driver side door of the vehicle who is not a public-safety officer.

8. The method of claim 1, wherein the one or more sensors comprises one or more of a front bumper impact sensor and a rear bumper impact sensor, the vehicular sensor data comprises impact sensor data from the one or more of the front bumper impact sensor and the rear bumper impact sensor, and the combination of the vehicle ignition status and the vehicular sensor data meeting the carjacking threshold condition comprises:
the vehicle ignition status being in an on-state; and
the impact sensor data indicating a detected impact.

9. The method of claim 1, wherein the one or more sensors comprises one or more cameras onboard the vehicle, the vehicular sensor data comprises image data from the one or more cameras, and the combination of the vehicle ignition status and the vehicular sensor data meeting the carjacking threshold condition comprises:
the vehicle ignition status being in an on-state; and
the image data indicating a person approaching a driver side door of the vehicle with one or more of a weapon, and an adorned mask.

10. The method of claim 1, wherein the one or more sensors comprises one or more of an environmental condition sensor and a vehicular condition sensor, the vehicular sensor data comprises condition data from one or more the environmental condition sensor and the vehicular condition sensor, and the combination of the vehicle ignition status and the vehicular sensor data meeting the carjacking threshold condition comprises:
the vehicle ignition status being in an on-state; and
the condition data indicative of a driver of the vehicle not needing help in overcoming one or more of environmental conditions and vehicular conditions.

11. The method of claim 1, further comprising:
providing a driver of the vehicle with an electronic selectable option to cancel one or both of the alert and the notification.

12. The method of claim 1, further comprising:
determining that the carjacking threshold condition is met when the vehicle ignition status is in an off-state, and the vehicular sensor data indicates a driver is within the vehicle or proximately located to the vehicle and a person who is not a public safety officer is approaching the vehicle; and
determining that the location of the vehicle is associated with the carjacking type of location comprises determining that the location of the vehicle is one or more of a gas station, an automated teller machine and a parking lot.

13. A device for an electronic response to a potential carjacking, the device comprising:
a communication interface; and
a controller, the controller configured to:
receive a location of a vehicle;
receive a vehicle ignition status of the vehicle;
receive vehicular sensor data generated by one or more sensors that are onboard the vehicle, the vehicular sensor data different from the location and the vehicle ignition status;
determine whether the location of the vehicle is associated with a carjacking type of location;
determine whether a combination of the vehicle ignition status and the vehicular sensor data meet a carjacking threshold condition; and
when both the location of the vehicle is associated with the carjacking type of location and the carjacking threshold condition is met, one or more of:
output an alert at the vehicle indicative of, or associated with, the potential carjacking; and
causing, via the communication interface, a notification to be transmitted to a communication device associated with a public safety agency or a monitoring service, the notification indicative of the potential carjacking.

14. The device of claim 13, wherein the controller is further configured to:
prior to outputting the alert or causing the notification to be transmitted, provide the location to a second computing device in communication with a camera external to, and separate from, the vehicle at the location; and
receive, from the second computing device, based on images from the camera external to the vehicle at the location, a confirmation that the carjacking threshold condition has been met,
wherein outputting the alert or causing the notification to be transmitted occurs based on receiving the confirmation.

15. The device of claim 13, wherein the one or more sensors comprise an exterior driver door handle sensor, the vehicular sensor data comprises external driver door handle sensor data from the exterior driver door handle sensor, and the combination of the vehicle ignition status and the vehicular sensor data meeting the carjacking threshold condition comprises:
the vehicle ignition status being in an on-state; and
the exterior driver door handle sensor data indicating a driver door being opened.

16. The device of claim 13, wherein the one or more sensors comprises one or more cameras onboard the vehicle, the vehicular sensor data comprises image data from the one or more cameras, and the combination of the vehicle ignition status and the vehicular sensor data meeting the carjacking threshold condition comprises:
the vehicle ignition status being in an on-state; and
the image data indicating a person approaching a driver side door of the vehicle.

17. The device of claim 13, wherein the one or more sensors comprises: an exterior driver door handle sensor and one or more cameras on-board the vehicle, wherein the vehicular sensor data comprises: external driver door handle sensor data from the exterior driver door handle sensor and image data from the one or more cameras, and wherein the combination of the vehicle ignition status and the vehicular sensor data meeting the carjacking threshold condition comprises:

the exterior driver door handle sensor data indicating a driver side door being opened;

the vehicle ignition status being in an on-state; and the image data indicating a person approaching the driver side door of the vehicle who is not a public-safety officer.

18. The device of claim 13, wherein the one or more sensors comprises one or more of a front bumper impact sensor and a rear bumper impact sensor, the vehicular sensor data comprises impact sensor data from the one or more of the front bumper impact sensor and the rear bumper impact sensor, and the combination of the vehicle ignition status and the vehicular sensor data meeting the carjacking threshold condition comprises:

the vehicle ignition status being in an on-state; and the impact sensor data indicating a detected impact.

19. The device of claim 13, wherein the one or more sensors comprises one or more cameras onboard the vehicle, the vehicular sensor data comprises image data from the one or more cameras, and the combination of the vehicle ignition status and the vehicular sensor data meeting the carjacking threshold condition comprises:

the vehicle ignition status being in an on-state; and the image data indicating a person approaching a driver side door of the vehicle with one or more of a weapon, and an adorned mask.

20. The device of claim 13, wherein the one or more sensors comprises one or more of an environmental condition sensor and a vehicular condition sensor, the vehicular sensor data comprises condition data from one or more the environmental condition sensor and the vehicular condition sensor, and the combination of the vehicle ignition status and the vehicular sensor data meeting the carjacking threshold condition comprises:

the vehicle ignition status being in an on-state; and the condition data indicative of a driver of the vehicle not needing help in overcoming one or more of environmental conditions and vehicular conditions.

* * * * *